United States Patent [19]

Stammreich et al.

[11] 4,053,177
[45] Oct. 11, 1977

[54] ADJUSTABLE LATCH

[75] Inventors: John Creighton Stammreich, Buena Park; Robert Dean Richter, Harbor City, both of Calif.

[73] Assignee: Tridair Industries, Torrance, Calif.

[21] Appl. No.: 694,002

[22] Filed: June 8, 1976

[51] Int. Cl.² ............................................. E05C 19/14
[52] U.S. Cl. .......................... 292/113; 292/DIG. 31; 292/DIG. 49; 292/DIG. 60
[58] Field of Search ............... 292/6 C, 113, 114, 247, 292/250, DIG. 31, DIG. 49, DIG. 60

[56] References Cited

U.S. PATENT DOCUMENTS

| 3,070,396 | 12/1962 | Swenson | 292/247 |
|---|---|---|---|
| 3,259,411 | 7/1966 | Griffiths | 292/113 |
| 3,664,696 | 5/1972 | Poe | 292/113 X |

*Primary Examiner*—Robert L. Wolfe
*Attorney, Agent, or Firm*—Thomas A. Seeman

[57] ABSTRACT

An adjustable, flush mounted, over-center hook latch of the type employed to secure aircraft panels. The effective length of the latch arm is adjustable to correct misalignment of the components joined by the latch by moving the pivot axis of the latch arm relative to the fulcrum axis of the latch handle. This is accomplished by a pair of cooperating yoke members, one of which is mounted about the pivot axis and the other about the fulcrum axis and are slidable relative to each other by a driver. By the particular arrangement of the parts, the latch can be adjusted when installed and in its closed position by the driver being engaged with a conventional drive tool extending through a small opening in the latch handle.

1 Claim, 11 Drawing Figures

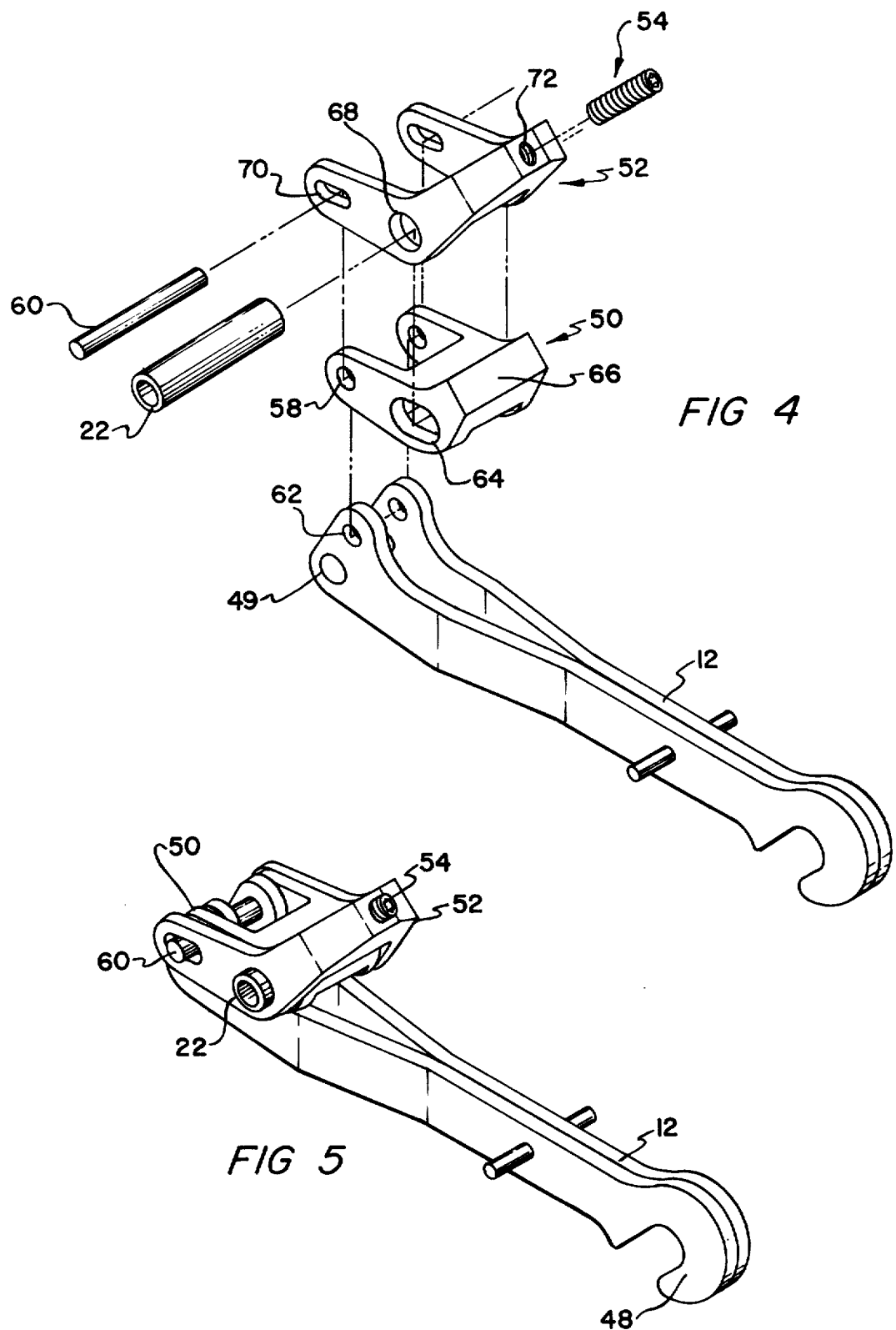

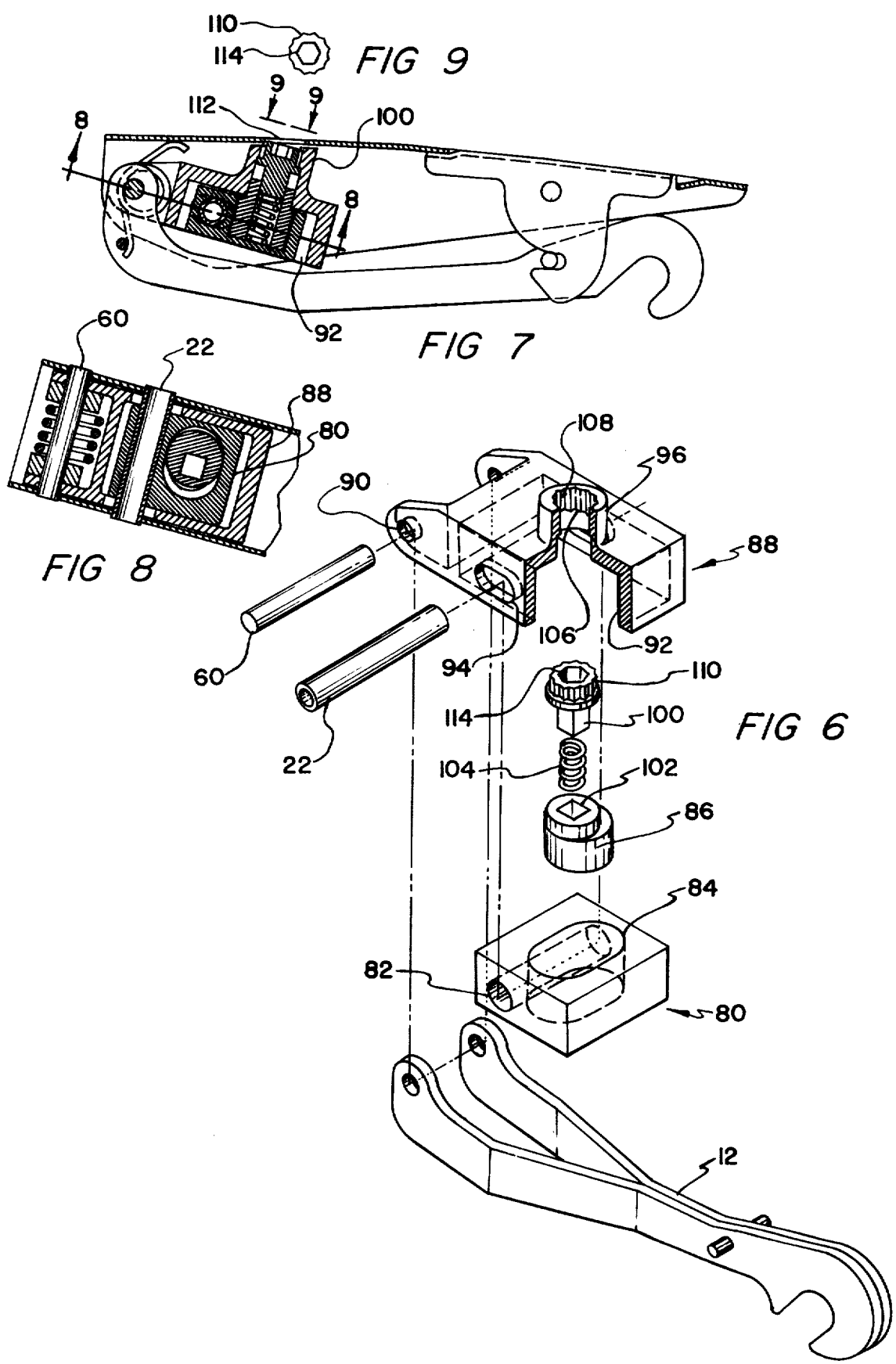

ADJUSTABLE LATCH

BACKGROUND OF THE INVENTION

This invention relates to a hook latch and more particularly, to an adjustable, flush mounted, over-center hook latch of the type used to secure aircraft panels.

Over-center hook latches are well known in the art. One such latch is shown in U.S. Pat. No. 2,712,955. As seen in this patent, the fulcrum axis of latch handle is mounted to a bracket on the aircraft panel and the latch hook engages a keeper on the aircraft structure. The latch is referred to as an over-center latch as when the latch is closed, the load on the latch hook creates a moment arm on the latch handle about the fulcrum axis in a direction which maintains the latch handle in its closed position.

The distance between the latch hook and the keeper is critical and must be maintained. If the distance is too great, the latch either will not close or will create excessive compression forces on the aircraft components and thereby possibly damaging them or the latch. If the distance is too close, the hook will not engage the keeper with suitable tension to maintain the panel on the aircraft. Consequently, it has been known to provide some type of adjusting means either in the latch itself or on the keeper to accurately adjust the hook relative to the keeper during initial installation and subsequently when stresses in the aircraft may misalign the aircraft components.

A disadvantage of prior adjusting means is that the latch must be open to make the adjustment. Since the proper distance of the hook and resulting tension on the latch cannot be ascertained until the latch is closed, it is therefore often necessary through trial and error to make several adjustments by opening and closing the latch before final correct adjustment is obtained. This is even more critical when a plurality of latches are aligned in a row on a large aircraft panel. Here, it has been found that after adjusting the latch, adjustment of the next latch may adversely effect the adjustment of the prior latch such that the whole process has to be repeated. The opening and closing of the latch to effect the adjustment is both time-consuming and combersome.

Another disadvantage of prior latches is that the tension in the latch is measured by the tension on the handle at or near its closed position. Consequently, the handle must be opened and pulled outwardly by a tension measuring device to determine the tension in the latch. The measurement is often inaccurate and difficult.

SUMMARY OF THE INVENTION

Therefore it is an object of this invention to provide a flush-mounted hook latch which can be easily adjusted after the latch is installed without opening the latch.

Another object is to provide an over-center, flush mounted hook latch which may be adjusted without effecting the over-center characteristics of the latch.

Since another object is to provide a flush-mounted hook latch which may be easily and accurately adjusted by a conventional drive tool extending through a small opening in the latch handle.

A further object is to provide a flush-mounted, over-center hook latch with a means of determining the tension on the latch in a simplified and accurate manner without opening the latch.

A further object is to provide a flush-mounted hook latch which is economical and feasible to manufacture.

Further objects of the invention will impart the obvious and will in part appear hereinafter.

In accordance with these objects, the invention comprises an over-center, adjustable, flush-mounted hook latch capable of being adjusted after the latch is installed and closed. The latch hook is adjusted relative to the keeper by moving the pivot axis of the latch arm relative to the fulcrum axis of the latch handle. This is accomplished by mounting a yoke about the pivot axis of the latch arm and a second yoke about the fulcrum axis of the latch handle. The yoke members cooperate with one another and are slidable relative to each other by a driver which is accessible through a small opening in the latch handle for rotation by an allen wrench.

In one embodiment, an inner yoke member is mounted about the pivot axis of the latch arm and slidable relative to an outer yoke member which is mounted about the fulcrum axis of the latch handle. The driver comprises an adjustment screw threaded to the outer yoke and bearing against the inner yoke.

In a second embodiment, an inner yoke is mounted to the fulcrum axis of the latch handle and an outer yoke is mounted to the pivot axis of the latch arm. The driver comprises a cam housed within the inner yoke and bearing against the outer yoke.

In a third embodiment, the yokes are of different configuration but are mounted about the respective pivot and fulcrum axis as in the second embodiment. The driver comprises a screw threaded to the inner yoke and bearing against the outer yoke.

In all embodiments, the pivot axis of the latch arm is moved relative to the fulcrum axis so as not to adversely effect the over-center characteristics of the latch. Also, the screw in the first and third embodiments and the cam in the second embodiment are suitably positioned to be easily reached by the allen wrench extending through the small opening in the handle. By the particular arrangement of parts, the torque measured at the driver is a direct function of the tension in latch. Therefore, the latch tension may be easily measured with the latch in the closed position by measuring the torque at the driver with a torque wrench or the like. Moreover, since a small tool such as an allen wrench can be used as a drive tool, the access opening in the latch handle can be kept at a minimum so as to not adversely effect the aerodynamic characteristics of the outer surface of the latch handle.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 4 is an isometric exploded view of the components for adjusting the latch illustrated in FIG. 1.

FIG. 5 is an isometric view illustrating the components of FIG. 4 in an assembled condition.

FIG. 6 is an elevational sectional view of the latch of FIG. 1 modified with a second embodiment of the latch adjustment components.

FIG. 7 is an isometric exploded view of the latch adjustment components, illustrated in FIG. 6.

FIG. 8 is a sectional view of the yoke members taken along the lines 8—8 of FIG. 7.

FIG. 9 is an end view of the cam driver taken along the lines 9—9 of FIG. 7.

Similar reference characters refer to similar parts throughout the several views of the drawings.

DESCRIPTION OF PREFERRED EMBODIMENTS

Figure 1:
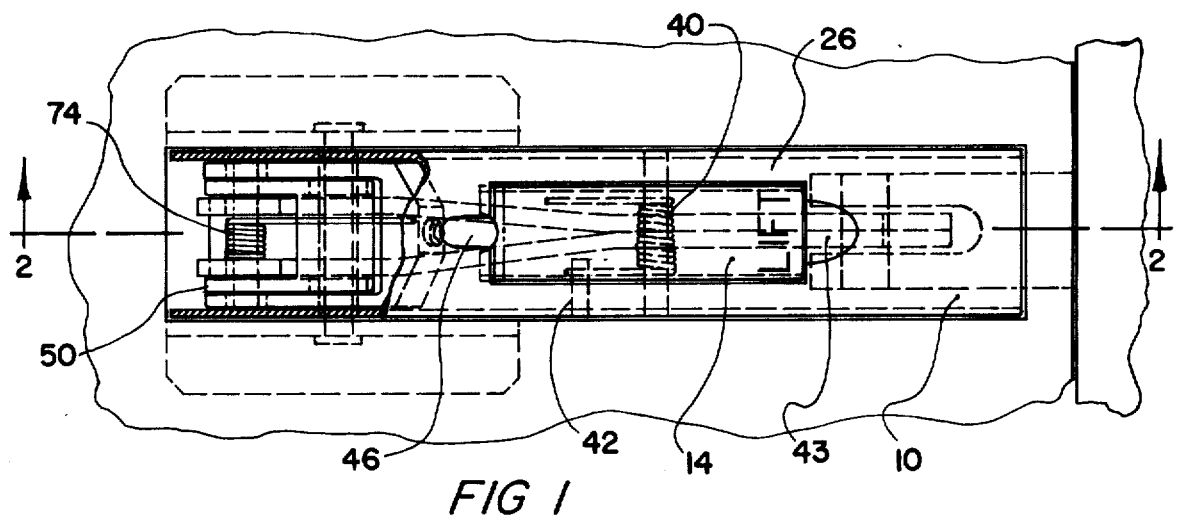
FIG. 1 is a plan view of one embodiment of the latch, with portions broken away and in section, showing the latch set in a panel structure, the surrounding structure being shown fragmentarily.

Referring now to the drawings in detail, there is illustrated in FIGS. 1 - 5, one embodiment of the invention. As illustrated, the inventive latch includes a handle 10, a latch arm or latching member 12, and a trigger 14.

Figure 2:
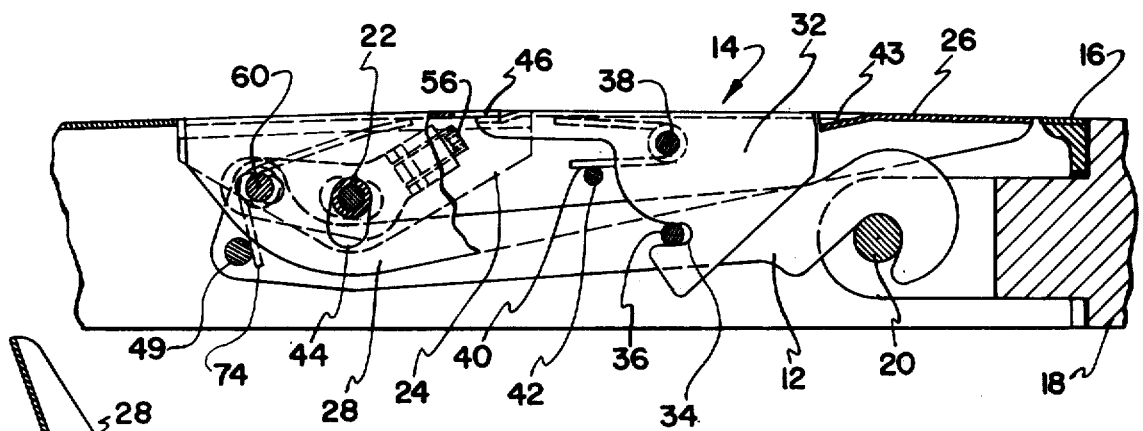
FIG. 2 is a longitudinal sectional view through 2—2 of FIG. 1 showing the latch in its closed position.
Figure 3:
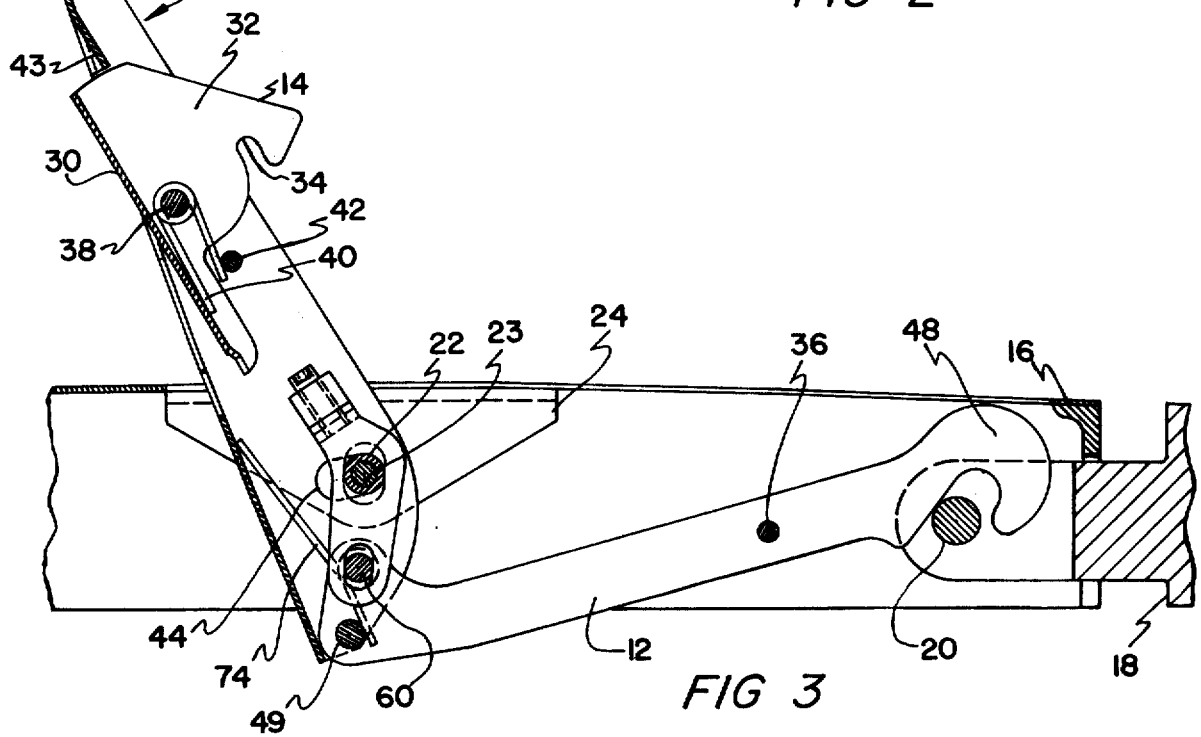
FIG. 3 is a longitudinal sectional view similar to FIG. 2, but showing the latch in its open position.

FIGS. 1 - 3 show the latch in combination with an aircraft structure with which it is preferably used, but it is to be understood that the latch could also be used for other purposes. A fragmentary view of the aircraft structure as seen comprises a panel 16 and frame 18 of the aircraft. Attached to a keeper bar on the frame is a pinlike keeper element 20, which extends toward the viewer as seen in FIGS. 2 and 3, with which the latch arm 12 cooperates in the manner hereinafter described. The door or panel 16 is provided with an accommodation slot disposed in registry with each keeper bar.

The latch is attached to the panel by the latch handle 10 being mounted about a hollow pin 22 pivotably supported over a mounting pin 23 extending between and supported at both ends of a pair of downwardly extending bracket arms 24 attached to the bottom face of the panel 16.

Latch handle 10, consisting of a sheet metal stamping, generally comprises a top surface 26 and two downwardly extending side walls 28. For aerodynamic considerations, it should be noted that the latch is mounted and the upper surface of the handle is formed in a manner to be flush with the outer skin of the panel and of the aircraft when the latch is in its closed position, as shown in FIGS. 1 and 2. The side walls of the latch handle have a general configuration as best shown in FIG. 2.

The top surface 26 of the latch handle is cut with a central opening to receive the trigger 14 where shown. Trigger 14 is generally U-shaped with an upper wall 30 and two downwardly extending side arms 32. Like the handle, the trigger is made of a sheet metal stamping and the bottom of the side arms 32 are cut with a cam surface leading into notch 34, suitably located to engage a cooperating pinlike stop 36 extending from each side of the latch arm 12 when the latch handle is closed. The trigger is supported and pivotal about a trigger pivot pin 38 attached at each end and extending between the handle side walls. The trigger is biased in a clockwise direction, as seen in FIG. 2, by a conventional wire spring 40, mounted about the trigger pivot pin 38. One end of the spring bears against the upper surface of the trailing end of the trigger and the other end of the spring bears against a pin spring stop 42 mounted to one side wall of the latch handle. A portion 43 of the upper surface of the latch handle 10 is bent inwardly to allow a lever, such as a screwdriver, to be inserted under the forward end of the trigger and lift it counterclockwise for opening the trigger under pressure.

Also provided in the side walls of the latch handle 28 is an elongated slot 44, which receives fulcrum pin 22. The provision of the slot permits the handle to be raised by trigger 14 sufficiently above the frame of the panel to enable the leading end of the handle to be firmly grasped and pulled backwardly to open the latch as shown in FIG. 3.

A small access opening 46 is also provided in the top surface of the handle to provide access for a drive tool to adjust the latch as hereinafter described.

Latch arm 12 is best seen in FIGS. 4 and 5. It is formed by a pair of metal members joined at their leading end and cut with a notch to form a hook 48 suitably shaped to mate with keeper 20. The trailing end of the latch arm 12 spreads outwardly into a "y" configuration and is supported by a spacer pin 49 extending between and attached to the side walls of the metal members. The latch arm is joined to the latch handle through an adjusting means comprising an inner yoke member 50, an outer yoke member 52, and a screw 54 having a drive socket at its outer end for engagement with a drive tool such as an allen wrench, not shown. The adjustment components and latch arm are shown disassembled in the exploded view of FIG. 4 and assembled in FIG. 5.

The inner yoke member 50 is generally a U-shaped metal casting with the two extending arms having a pair of openings 58 to receive a latch arm pivot pin 60. Pivot pin 60 extends through holes 62 in latch arm 12 which is pivoted about pivot pin 60 inside yoke 50. Also, extending through the underbody of inner yoke 50 is a slotted opening 64 for receipt of fulcrum 22, which is slidable with minimal vertical clearance within the confines of the slot. The forward upper end of yoke 50 is provided with a flat extended surface 66 on which screw 54 bears against.

Outer yoke 52 may also be best described as generally a U-shaped metal casting mounted about fulcrum pin 22, which extends through fulcrum pin openings 68 in the side walls of the yoke. The trailing end brackets of the yoke carry slotted openings 70 for receiving pivot pin 60 with minimal clearance perpendicular to the slots, and for guiding the lateral sliding movement of pin 60, yoke 50 and latch arm 12. The upper leading end of the yoke 52 is canted upwardly and forwardly and includes a threaded opening 72 for threaded engagement with adjustment screw 54, also referred to as a driver. The adjustment screw is directed to bear against the upper surface of the inboard yoke in a manner to move the inner yoke and attached latch arm in the longitudinal direction of the slotted side walls of the yokes 50, 52.

Spring 74 (FIG. 3) is mounted above pivot pin 60 within the trailing ends of the latch arm 12. One end of the spring bears against the spacer pin 49 and the other against the under surface of the latch handle in such a manner as to bias the latch handle in the open position shown in FIG. 3.

In operation, after the latch panel 16 is suitably positioned in the opening of the aircraft fram 18 to which the panel is to be secured, hook 48 of the latch arm is positioned relative to the keeper 20 as shown in FIG. 3.

Thereafter, the latch handle is moved clockwise, as seen in FIG. 3, about fulcrum axis or fulcrum pin 22 until the latch is in a closed position as shown in FIGS. 1 and 2. In this position, the latch secures the panel to the aircraft structure because of the compression load created by the latch between the panel 16 and the frame 18 of the aircraft. As the latch handle is moved clockwise to its fully closed position, notch 34 of trigger 14 is cammed into engagement with stop pin 36 and thereafter locking the latch in its closed position.

To open the latch, the trigger is lifted by pressing the rearward end of the trigger downwardly against spring 40, thereby moving notch 34 from engagement with the stop 36. In the event the trigger cannot be lifted by finger pressure because of excessive load on the latch, a screwdriver may be inserted beneath the leading end of the trigger and the trigger forced open. Spring 74 then springs the latch handle upwardly until bottom end of slot 44 in handle 10 engages the fulcrum pin 22. This leaves adequate room at the forward end of the latch handle to be grasped by hand and then pulled counterclockwise to open the latch.

The latch can be adjusted to maintain the proper load between the panel and the aircraft frame by adjusting the distance of hook 48 relative to the fulcrum axis 22. Although this may be accomplished with the latch in the open position, it is preferably accomplished when the latch is closed as it enables the latch to be correctly adjusted while under load.

The hook is adjusted relative to the fulcrum axis by movement of the yoke members relative to each other along the axis of their confined movement. This is accomplished by inserting a drive tool, such as an allen wrench, into the screw socket 56 of the driver. The torque on the driver is a direct function of the load on the aircraft components, or the load on the latch. Therefore, the load can be easily measured by measuring the torque of the drive tool with a torque wrench or other similar instrument. As should be easily understood, rotation of the screw inwardly slides the inner yoke 50 outwardly and thus separates the two yokes as well as the distance between the pivot pin or pivot axis 60 of the latch arm relative to the fulcrum axis 22 of the latch handle. As a consequence, the distance between the fulcrum axis and the hook 48 is reduced thereby increasing the securing forces on the panel.

Conversely, moving the adjustment screw outwardly, brings the pivot axis 60 closer to the fulcrum axis 27 and increases the distance between the fulcrum axis and the hook thereby reducing the load on the panel relative to the frame of the aircraft.

The driver is rotated in the desired direction, until a predetermined torque on the drive tool, corresponding to the desired load on the latch, is obtained.

Importantly, the limits of adjustment of the pivot axis of the latch arm, controlled by the length of slotted openings 64, 70, maintain the center of the fulcrum axis above a line of force drawn through the center of pivot axis 22 and the center of the keeper pin 20. Consequently, the latch is maintained in its over-center condition whereby the tension forces on the latch operate to maintain the latch in a closed position.

Other embodiments for adjusting the latch are shown in the second and third embodiments of the invention. Other than the adjusting components, which will be described in the following description, all other components of the latch remain the same as well as the general operation of the latch. Thus these aspects of the latch will not be repeated when describing the second and third embodiments except where believed necessary for clarity.

FIGS. 6 - 9 show the second embodiment of the adjustment means. In this second embodiment, the inner yoke member 80 comprises a four-sided, blocklike member mounted to fulcrum pin 22' which extends through an opening 82 of the member where shown. Disposed in the upper surface of the yoke member 80 is a cavity 84 shaped with a cam surface about its side wall for cooperative engagement with cam 86. An outer yoke member 88 extends over and above the inner yoke member and is mounted about pivot pin 60', of the latch arm 12', which extends through a pair of holes 90 in the two rearwardly extending arms of the yoke. The under surface of yoke 88 is formed with a boxlike cavity 92 for receiving the inboard yoke. The side walls of the cavity contain axial slots 94 slidably supporting fulcrum pin 22 with minimal vertical clearance.

The upper portion of the outer yoke supports an integral housing 96 having a central bore extending therethrough and communicating with the lower cavity 92. Received within the bore is the upper, reduced diameter portion of cam 86 and an associated cam operator 100, cam and cam operator also referred to as a driver, extending into a mating four-sided straight wall bore 102 of the cam. Spring 104 residing within cam bore 102 biases the cam operator upwardly against a shoulder 106 in the housing bore, functioning as an upward stop for the cam operator.

The portion 108 of the housing bore above shoulder 106 is splined as shown to receive the serrated surface 110 on the head of the operator, thereby preventing the operator from being rotated until it is depressed against spring 104 below the shoulder 106.

Adjustment of the latch is similar as described for the first embodiment. To move the pivot axis of the latch rearwardly and thereby increase tension on the latch and load on the panel, an allen wrench, not shown, is inserted through the small access opening 112 in the latch handle and into the socket 114 of the cam operator. The cam operator is then pushed downwardly until the head of the operator is below shoulder 106 and then rotated to cam the outer yoke 88 to the left relative to the inner yoke 80, as seen in the drawings. Conversely, the outer yoke will be cammed to the right to move the pivot axis 60 closer to the fulcrum axis 22 and thereby reduce the tension in the latch. As before, the line of force between the keeper and the center of the pivot axis is maintained above the fulcrum axis to insure that the forces acting on the latch will encourage it to be maintained in a closed position. As previously described, the load in the latch may be determined by measuring the torque at the driver.

Figure 10:
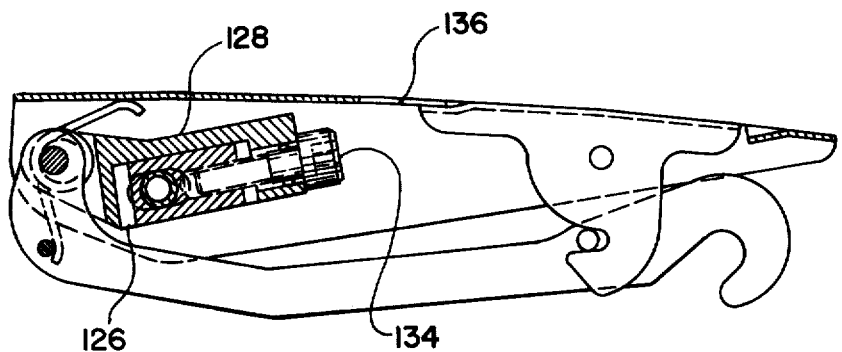
FIG. 10 is an elevational sectional view of the latch of FIG. 1 modified with a third embodiment of the latch adjustment components.
Figure 11:
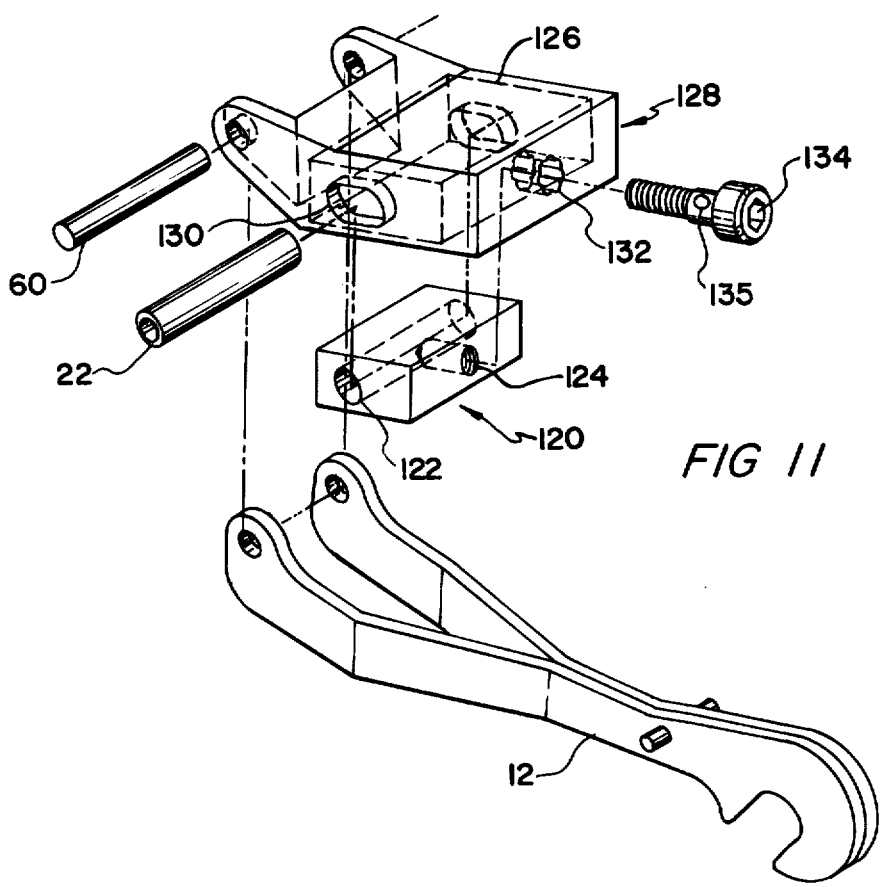
FIG. 11 is an isometric exploded view of the latch adjustment components, illustrated in FIG. 10.

The third embodiment is shown in FIGS. 10 and 11. In this embodiment, a blocklike inner yoke 120 is mounted to the fulcrum axis 22 which extends through bore 122 in the yoke. A threaded, blind-ended bore 124 extends inwardly from the leading end of the yoke.

The inner yoke 120 is received within a bottom boxlike cavity 126 of an outer yoke 128. Slots 130 are formed in the side walls of the yoke to slidably receive with minimal vertical clearance the fulcrum pin 22', and the forward end of the yoke contains a splined bore 132 for registry with screw or driver 134. The screw carries spring loaded detents 135 along its shank for engagement with the splines of the bore 132 to lock the screw against rotation caused by vibration and the like. The threaded portion of the screw is in threaded engagement with bore 124 of yoke 120. As viewed in the drawings, the rearwardly exending ends of the outer yoke are bored to receive pivot pin 60".

To adjust the latch, a wrench, not shown, is inserted into the socket 134 through a small access opening 136 of the latch handle. Rotation of the drive screw clockwise moves the screw inwardly into the first yoke member. In doing so, the head of the screw bears against the forward outer surface of the outboard yoke member and moves that yoke member to the left. In this manner the distance between the pivot axis and the fulcrum axis is increased with a corresponding increase in the tension of the latch. Conversely, turning the screw counterclockwise withdraws the screw from the inboard yoke thereby moving the pivot axis closer to the fulcrum axis and reducing the tension in the latch. As before, the load in the latch may be determined by measuring the torque at the driver.

The movement of the pivot axis relative to the fulcrum axis is limited by the slots 130 to maintain the latch in an over-center condition. That is, the line of force drawn between the center line of the keeper and the pivot axis is at all times above the fulcrum axis of the latch handle.

It should now be evident from the above description that an adjustable, flush mounted, over-center hook latch has been provided with many important advantages. Tension on the latch, and resultingly on the aircraft components that are secured, may be easily measured with the latch under tension by measuring the torque of the driver or drive tool. The latch can be adjusted without opening the latch, and the arrangement of parts permits a small conventional drive tool to be utilized to make the adjustment. Thus, the access opening in the latch handle for the drive tool is kept at a minimum for aerodynamic considerations. Further, the adjustment of the latch does not affect the desirable over-center characteristics of the latch. Moreover, the parts utilized make for a lightweight latch which is important for aircraft usage and the parts are economical and feasible to manufacture.

It will thus be seen that the objects set forth above, among those made apparent from the preceding description, are efficiently attained and, since certain changes may be made in the above construction with departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described:

I claim:

1. An adjustable overcenter aircraft hook latch having an open and closed position comprising:
    a. a pivotable handle member mounted about a fulcrum axis at one end thereof;
    b. a latching member pivotably connected about a pivot axis at said one end of the handle member and extending toward the other end of said handle member when said latch is in its closed position;
    c. said latching member having means at its extremity for engaging a keeper and slidable relative to said handle member;
    d. adjusting means for adjusting said pivot axis relative to said fulcrum axis comprising a first yoke member mounted about said pivot axis, a second yoke member mounted about said fulcrum axis and cooperating with said first yoke member, and a driver for moving said yoke members relative to one another;
    e. said handle member having an access opening in its outer face for the engagement of said driver by a drive tool when said latch is in its closed position;
    f. said first yoke member being generally U-shaped with extending arms and a closed end portion, said arms mounted about said pivot axis through an opening therein, said fulcrum axis passing through slots in said first yoke member forward of said pivot axis, and the closed end portion of said first yoke member extending upwardly and forwardly above said fulcrum axis and terminating into a flat-bearing surface facing the access opening in said handle when the latch is in its closed position;
    g. said second yoke member overlaying said first yoke member and being generally U-shaped with extending arms and a closed end portion, said second yoke member mounted about said fulcrum axis through an opening therein, said pivot axis passing through slots in the arms of said second yoke member rearwardly of said fulcrum axis, and the closed end portion of said second yoke member extending upwardly and forwardly above said flat bearing surface of said first yoke member and in alignment with said surface and said access opening in said handle when the latch is in its closed position;
    h. said slots in said first and second yoke members particularly arranged with respect to each other to guide said pivot axis relative to said fulcrum axis to maintain said latch in an overcenter condition when the latch is in its closed position;
    i. said driver comprising a screw threaded to the second yoke member and bearing against the flat surface of said first yoke member, and said screw being in alignment with said access opening in said handle when the latch is in its closed position; and
    j. said first yoke member, pivot axis and latching member slidable relative to said second yoke member and fulcrum axis when said first yoke member is driven by said driver.

* * * * *